US007132925B2

(12) United States Patent

Johnson et al.

(10) Patent No.: US 7,132,925 B2
(45) Date of Patent: Nov. 7, 2006

(54) CONTAINER WITH A SELECTIVE OPENING AND CLOSING MECHANISM

(76) Inventors: Ronald J. Johnson, 20691 View Oaks Way, San Jose, CA (US) 95120; Kenneth R. Johnson, 985 Old Orchard Rd., Campbell, CA (US) 95008

( * ) Notice: Subject to any disclaimer, the term of this patent is extended or adjusted under 35 U.S.C. 154(b) by 0 days.

(21) Appl. No.: 10/464,004

(22) Filed: Jun. 17, 2003

(65) Prior Publication Data

US 2003/0230124 A1 Dec. 18, 2003

Related U.S. Application Data

(60) Provisional application No. 60/390,061, filed on Jun. 18, 2002.

(51) Int. Cl.
*H04Q 1/00* (2006.01)

(52) U.S. Cl. .............................. 340/5.73; 340/825.22; 340/825.69; 340/5.28

(58) Field of Classification Search ............... 340/5.28, 340/5.73, 5.61, 5.64
See application file for complete search history.

(56) References Cited

U.S. PATENT DOCUMENTS

| | | | | |
|---|---|---|---|---|
| 4,218,690 | A * | 8/1980 | Ulch et al. | 340/5.22 |
| 5,774,059 | A * | 6/1998 | Henry et al. | 340/5.54 |
| 5,894,277 | A * | 4/1999 | Keskin et al. | 340/5.21 |
| 6,057,779 | A * | 5/2000 | Bates | 340/5.21 |
| 6,185,773 | B1 * | 2/2001 | Goedde | 340/5.1 |
| 6,323,782 | B1 * | 11/2001 | Stephens et al. | 340/5.73 |
| 2003/0090364 | A1 * | 5/2003 | Cardinale et al. | 340/5.54 |

* cited by examiner

*Primary Examiner*—Brian Zimmerman
(74) *Attorney, Agent, or Firm*—Haverstock & Owens LLP

(57) ABSTRACT

A system and apparatus which includes one or more locking container devices comprising a closeable container for holding at least one object; lock coupled to the container and moveable between a lock position and an unlock position; and programmable timer circuit for actuating the lock at a programmed time which is either specified or randomly set. The container device alternatively includes a receiving component for sensing a change an external condition including but not limited to, geographic location, temperature, sound and one or more predetermined operations. The timer circuit is alternatively unlocked by receiving an unlock signal via an appropriate communication medium from a remote source. The container device also includes a transmitter for transmitting an appropriate signal to the remote source. An interface terminal is coupled to the remote source and configured to accept at least one external condition instruction to be transmitted to the receiving component.

35 Claims, 6 Drawing Sheets

CONTAINER WITH A SELECTIVE OPENING AND CLOSING MECHANISM

RELATED APPLICATION

This Patent Application claims priority under 35 U.S.C. 119 (e) of the co-pending U.S. Provisional Patent Application, Ser. No. 60/390,061 filed Jun. 18, 2002, and entitled "CONTAINER WITH DELAYABLE OPENING AND CLOSING MECHANISM AND METHOD THERETO". The Provisional Patent Application, 60/390,061 filed Jun. 18, 2002, and entitled "CONTAINER WITH DELAYABLE OPENING AND CLOSING MECHANISM AND METHOD THERETO" is also hereby incorporated by reference.

FIELD OF THE INVENTION

The invention relates to an apparatus for holding objects in a container in general, and specifically, to a container with a selective opening and closing mechanism.

BACKGROUND OF THE INVENTION

Containers and gift boxes have been widely used in society as well as in retail. Many of these containers include locking mechanisms which prevent others from accessing the contents of the containers. However, standard containers with locking mechanisms do not have the ability to unlock at a particular time which is designated by an individual. Thus, the owner of the container must possess a key which is used to lock and unlock the container. In addition, there are no lockable container devices in the market which allow the container to lock or unlock at a predetermined or randomly set time. Additionally, there are no lockable container devices in the market which allow the container to lock or unlock upon sensing one or more satisfying external events which occur.

SUMMARY OF THE INVENTION

One aspect of the invention is directed to a locking container device which comprises a closeable container which holds at least one object; a lock that is coupled to the container and moveable between a lock position and an unlock position; and a programmable circuit which actuates the lock between the lock position and the unlock position at an unlock time. The lock is moved to the lock position at activation and does not move to the unlock position until the unlock time. In one embodiment, the container automatically opens upon the lock moving to the unlock position and alternatively the container is manually openable upon the lock moving to the unlock position. The programmed time is predetermined and alternatively randomly set. In one embodiment, the timer circuit is unlocked by receiving an unlock signal via a wireless or alternatively a hard wired medium from a remote source. The container device further comprises a display which displays the selected amount of time.

In another aspect of the invention, a portable locking container device comprises a closeable container which holds at least one object. The container device includes a lock that is coupled to the container and is moveable between a lock position and an unlock position. The container device includes an electronic sensor which senses a change in at least one predetermined external condition and a circuit that is coupled to the electronic sensor and actuates the lock to move between the lock position and the unlock position in response to the change in the external condition. The external condition is alternatively signal dependent, wherein the circuit actuates the lock to move between the lock position and unlock position upon the sensor receiving an unlock signal from a remote source location. The unlock signal is transmittable by wireless media and alternatively by hard wire. The container device further comprises a transmitter for transmitting an appropriate signal to the remote source location. Alternatively, the external condition is time dependent. The time dependent external condition is selected to be a desired time and alternatively is randomly determined. Preferably, the circuit further comprises a timer circuit for actuating the lock a selected amount of time after receiving the activation signal. The container device further comprises a display which displays the selected amount of time. Alternatively, the external condition is a geographically dependent parameter, wherein the circuit instructs the lock to move between the lock position and unlock position when the container device is in an appropriate geographical location. Alternatively, the external condition is dependent on including, but not limited to, one or more predetermined operations being satisfied, temperature, and sound. In one embodiment, the container device automatically opens upon the lock moving to the unlock position. Alternatively, the container device is manually openable upon the lock moving to the unlock position. The container device further comprises an interface terminal that is coupled to the remote source location and is configured to accept at least one external condition instruction that is to be transmitted to the circuit.

In another aspect of the invention, a selectively locking container device comprises a container which holds one or more objects. The container device includes a lock which locks the container, wherein the lock is moveable between a lock position and an unlock position. The container device includes a circuit which selectively moves the lock between the lock position and the unlock position upon receiving an unlock signal from a remote transmitting source by a wireless or wired medium. Preferably, the container automatically opens upon the lock moving to the unlock position and alternatively unlocks and is manually openable upon the lock moving to the unlock position. The circuit further comprises a receiver which receives the unlock signal and a transmitter which transmits an appropriate signal to the remotely located source. The receiver further includes a sensor, wherein circuit moves the lock between the lock position and the unlock position in response to the sensor sensing a change from a first environmental state to a second environmental state. The first and second environmental states are dependent on one or more factors including, but not limited to, at least one predetermined operation being satisfied; temperature; sound; geographic location, and preferably time. The specific time provided by the time component instruction is predetermined and alternatively random. The circuit is alternatively placed in an operating mode upon receiving an operation signal from the remotely located source. An interface terminal is alternatively coupled to the remote source location, whereby the interface terminal is configured to accept at least one external condition instruction that is to be transmitted to the circuit.

Another aspect of the invention is directed to a system that includes a plurality of selectively locking container devices. The system comprises a plurality of container devices, each further comprises a container which holds one or more objects; a lock that is coupled to the container and is moveable between a lock position and a unlock position; and a receiver circuit that is coupled to the lock, whereby the receiver circuit is configured to actuate the lock between the lock and unlock position. The system also comprises a remotely located transmitting source which transmits one or more instruction signals to at least one of the plurality of container devices, whereby the receiver circuit in at least one selected container devices automatically moves the lock between the lock position and the unlock position in response to receiving the one or more instruction signals by either a wireless or hard wired media. In one embodiment, at least one of the container devices automatically opens upon the lock moving to the unlock position and alternatively at least one of the containers unlocks and is manually openable upon the lock moving to the unlock position. The one or more instruction signals include a time dependent parameter, wherein the lock moves between the lock position and unlock position at an appropriate time that is specified by the time dependent parameter. In one embodiment, the receiver circuit moves the lock a predetermined amount of time after receiving the instruction signals and in another embodiment moves the lock simultaneously upon receiving the instruction signals. The time based parameter is predetermined and alternatively randomly determined. In one embodiment, the one or more instruction signals include a geographically dependent parameter, wherein the receiver circuit instructs the lock to move between the lock position and unlock position when the container device is in an appropriate geographical location. Alternatively, the instruction signal is dependent on a predetermined operation being satisfied prior to the lock moving between the lock and unlock positions. Alternatively, at least one of the circuits actuates the lock in response to an appropriate change in temperature. Alternatively, at least one of the circuits in the plurality of container devices actuates the lock in response to an appropriate variation in sound.

DETAILED DESCRIPTION OF THE PRESENT INVENTION

The present invention is directed to a container device with a selective opening and closing mechanism. In general, the container device is preferably locked and cannot be opened by the recipient of the container until a circuit within the container unlocks the container device. In the preferred embodiment, the container device is a preprogrammed device which opens at a time subsequent to being activated. In the preferred embodiment, the circuit is unlocked by conventional methods. In an alternate embodiment, the container device is unlocked upon receiving a wireless unlock signal from a remotely located transmission source. Upon receiving the unlock signal, a control circuit alternatively performs one or more sets of programmed instructions and unlocks the container device upon compliance with the instructions, thereby allowing the recipient of the container to open the container device and access its contents. It should be noted that the above is only a general description of the present invention and is not limited thereto.

Figure 1A:
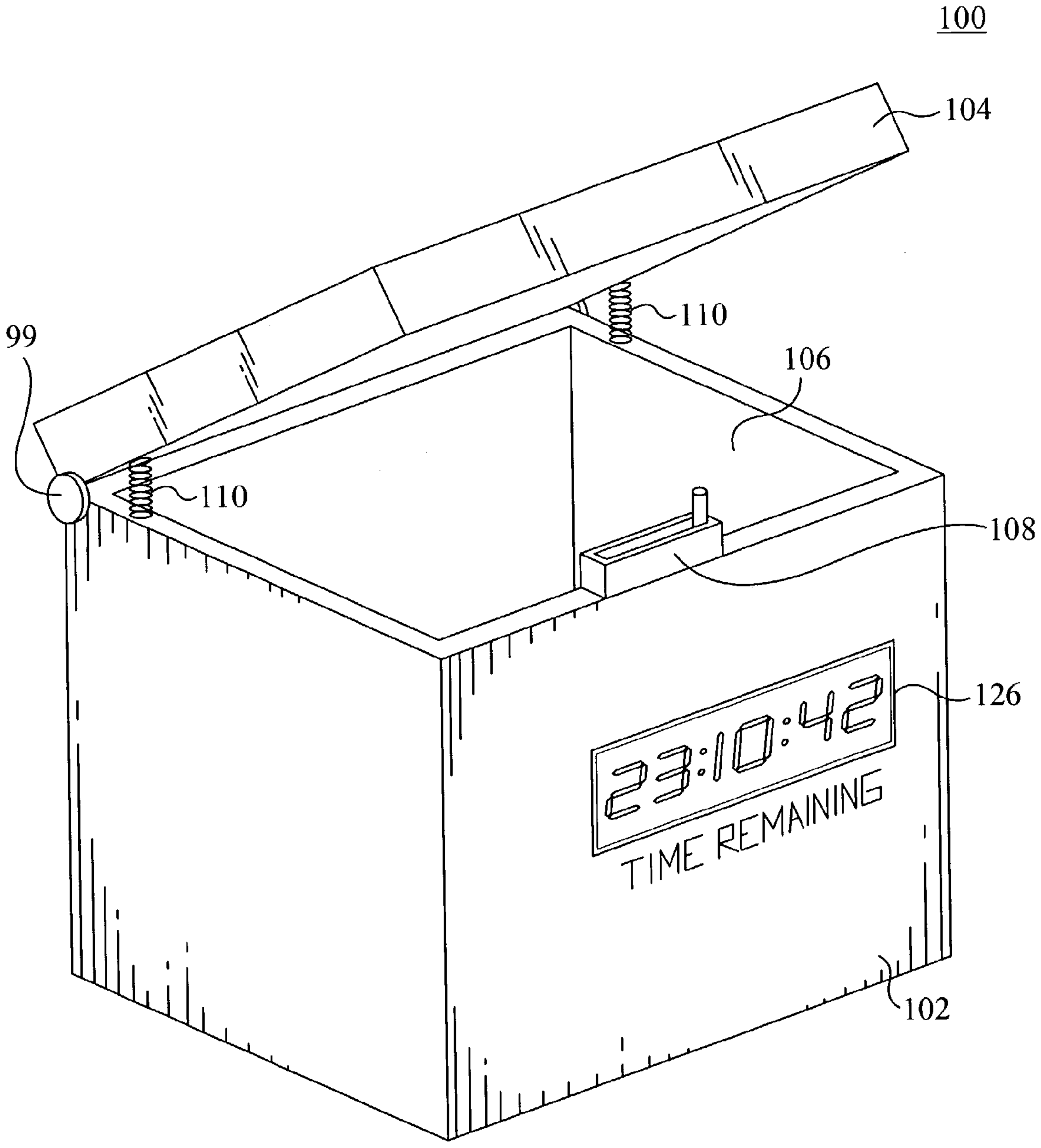
FIG. 1A illustrates a perspective view of a preferred container device in accordance with the present invention.

FIG. 1A illustrates a perspective view of a preferred cube-shaped container device 100 in accordance with the present invention. It should be noted that the container device 100 can have any shape and be of any size as well as be able to be used for any event or occasion. For instance, the container device 100' shown in FIG. 2 has an egg shape body which contains a prize inside, whereby the egg "hatches" or opens after the container device 100 is unlocked. Preferably, the container device 100 is portable, such that the container device 100 can be transported by a receiver.

Specifically, the container 100 shown in FIG. 1A includes a body 102 having a lid 104 coupled thereto and an internal cavity 106 for holding one or more objects. The lid 104 is preferably coupled to the body by a hinge pin 99, whereby the lid 104 rotates about the pin 99 to open and, close the container 100. In addition, the container device 100 includes a locking mechanism 108 which preferably moves between an unlocked position and a locked position. The lock 108 is preferably an electronic type device. Alternatively, the lock 108 is a non-electronic type device. In the locked position, the lock 108 prevents the lid 104 from opening when the container device 100 is closed, thereby preventing access to the container device 100. In addition, access is denied to the container until the lock 108 is moved to the unlock position. Thus, the lock 108 allows the lid 104 to open or be opened when the lock 108 is in the unlocked position. The details and the types of locks 108 available are well known by those skilled in the art and any appropriate type of lock can be used.

In addition, the container device 100 preferably includes a spring mechanism 110 coupled to the lid 108 which resiliently urges the lid 104 to open. Thus, the spring mechanism 110 causes the lid 104 to automatically open when the lock 108 moves to the unlocked position. Alternatively, the container device 100 does not include a spring mechanism 110, whereby the locking mechanism 108 merely unlocks to allow the user to manually open the container. Thus, the container device 100 may be used as a gift-box, wherein the container device 100 is merely unlocked and does not swing open when the lock moves to the unlock position.

Figure 3A:
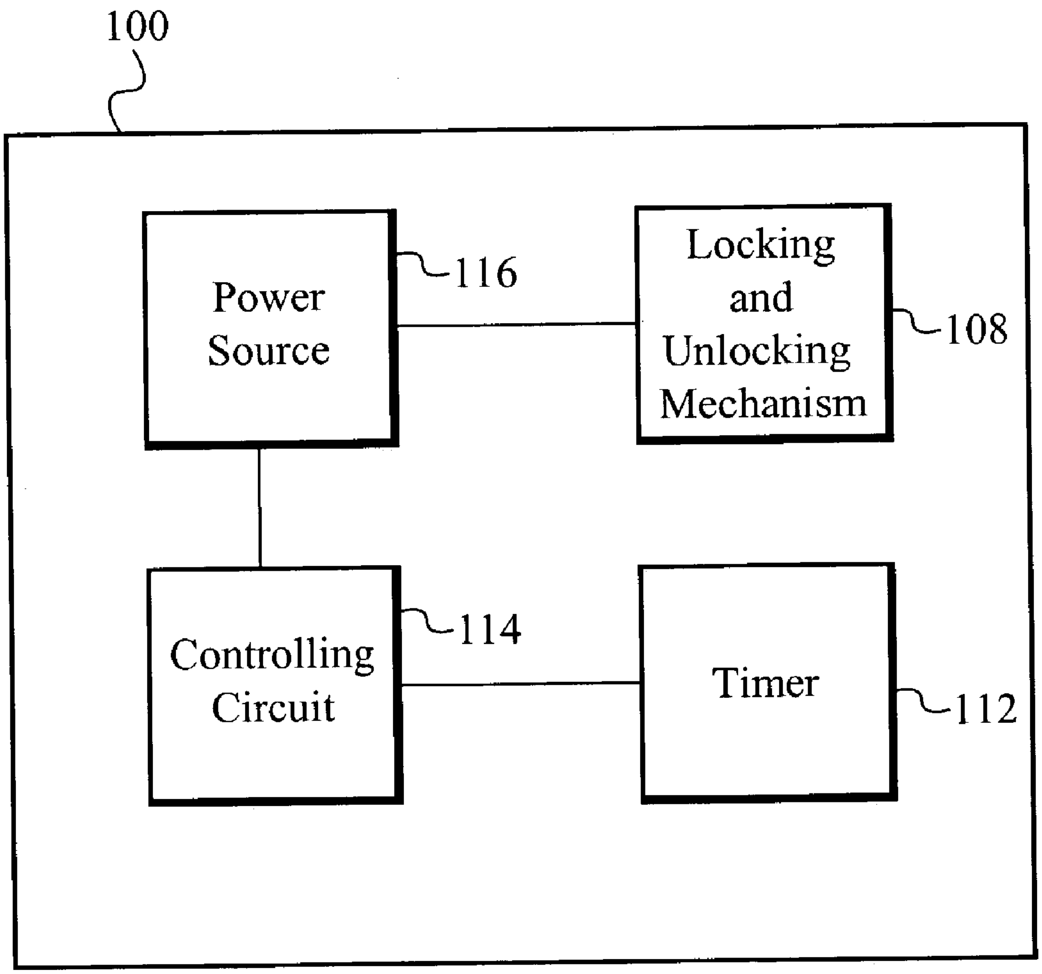
FIG. 3A illustrates a block diagram of the control mechanism of the preferred container device in accordance with the present invention.

In reference to FIGS. 1A and 3A, the container device 100 includes a control circuit 114 which is coupled to the locking mechanism 108 and preferably functions to operate the locking mechanism 108 to lock and unlock the container device 100. In addition, as shown in FIG. 3A, the container device 100 preferably includes a timer 112 which is coupled to the control circuit 114. A power source 116 is coupled to all of the above components to operate the container device 100. The preferred container device 100 unlocks at a delayed time, because the timer 112 is programmed to actuate the locking mechanism 108 at a specific time after activation. Alternatively, the timer 112 is preprogrammed to actuate the locking mechanism 108 at an arbitrary, random time after activation. The timer 112 is preferably an electronic timer. Alternatively, the timer 112 is a non-electronic timer. As shown in FIG. 1A, the container device 100 alternatively includes a timer display 126 coupled to the control circuit

114 which shows how much time has elapsed or is remaining before the locking mechanism 108 actuates.

Figure 3B:
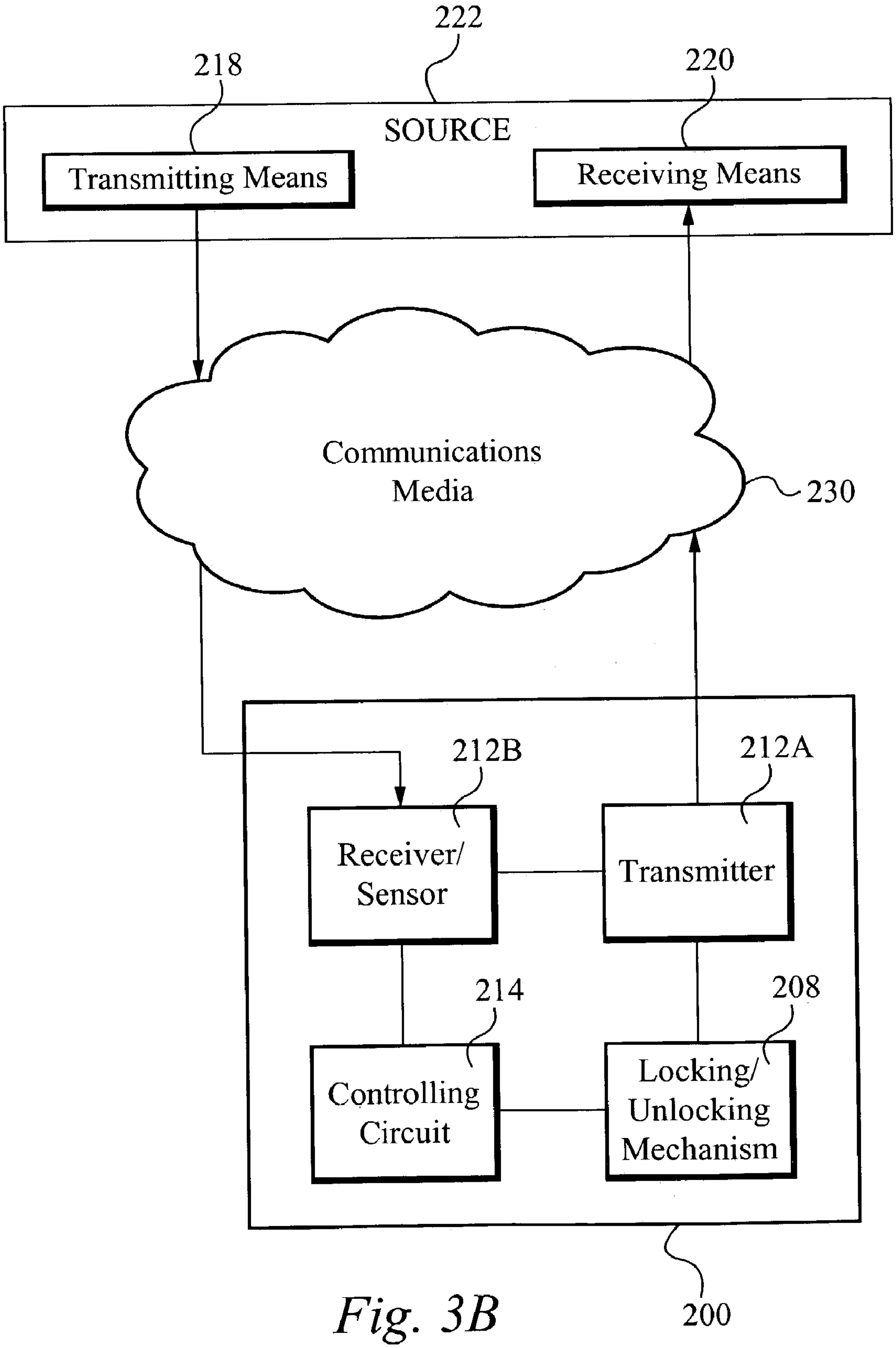
FIG. 3B illustrates a block diagram of the control mechanism of the alternative container device in accordance with the present invention.
Figure 4:
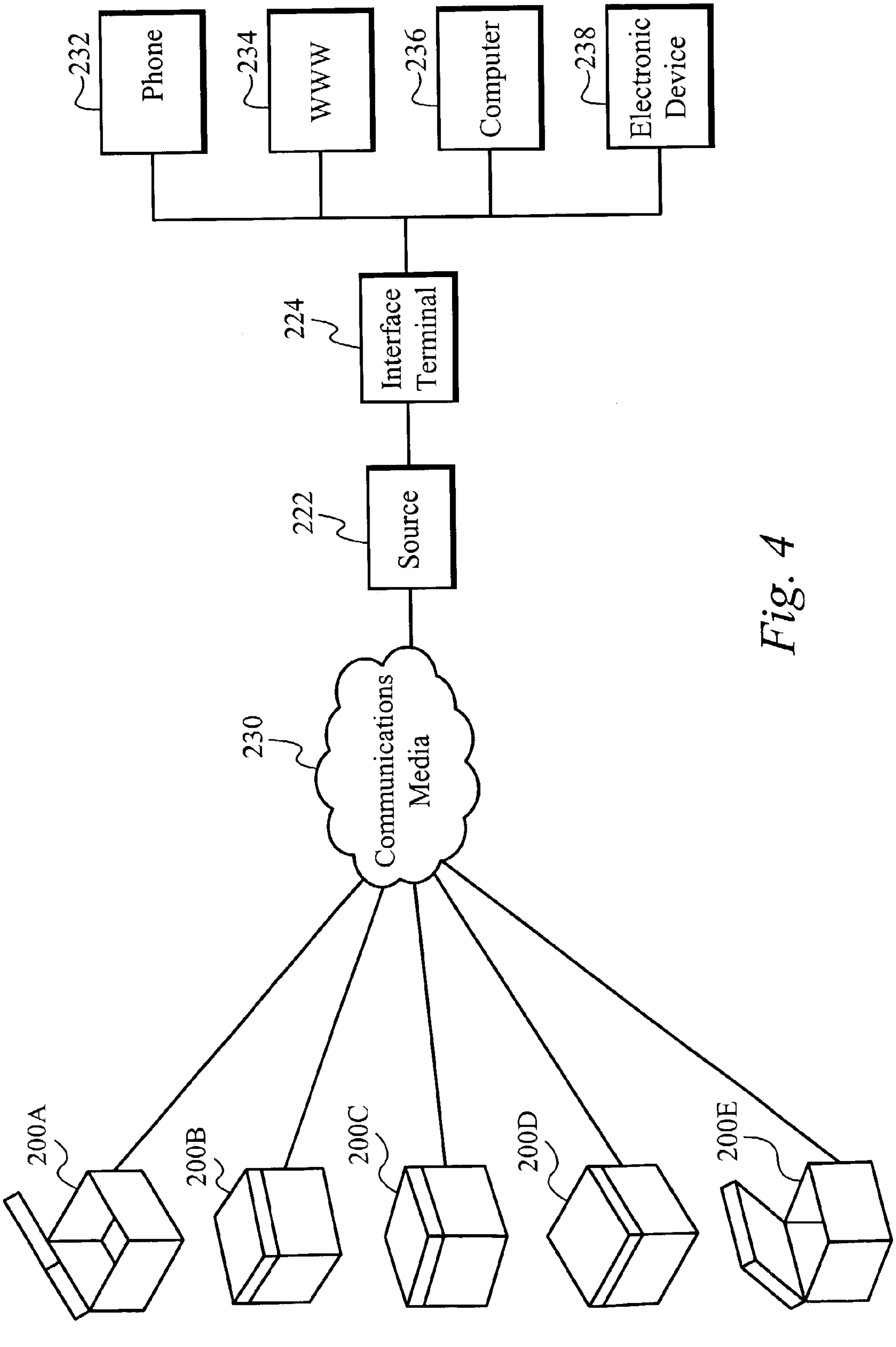
FIG. 4 illustrates a diagram of a network of container devices in accordance with the present invention.

Preferably, the control circuit 114 and the timer 112 are activated by the manufacturer at the point of distribution using conventional programming methods. Preferably, the locking mechanism 108 is locked when the control circuit 114 is activated. Alternatively, the locking mechanism 108 is locked prior to the control circuit 114 being activated. For example, the timer 112 is preprogrammed with a selected time duration, such as twenty four hours, whereby the control circuit 114 actuates the locking mechanism 108 to unlock the container device 100 twenty four hours after being activated. In another embodiment, the timer 112 is programmed with a specific date and time when the container device 100 is desired to unlock. Alternatively, the control circuit 112 is programmed with a time range to open, whereby the control circuit 114 randomly selects a time within that range to actuate the lock 108. In another alternate embodiment, the control circuit 112 is configured such that the timer 112 begins a countdown upon the user entering in a preprogrammed code into a keypad (not shown) on the container device 100 itself. Alternatively, the timer 112 begins countdown after the user swipes a key, card or keycard through a keycard interface (not shown). It should be apparent to one skilled in the art that the time instructions are alternatively provided to the control circuit 114 via the interface terminal discussed below (FIG. 4). Alternatively, the control circuit 114 is controlled by receiving a wireless unlock signal from the transmitting means 218 (FIG. 3B) at the source 222 (FIG. 3B). Alternatively, the transmitting means 218 (FIG. 3B) in the source 222 (FIG. 3B) activates the control circuit 114 as well as provides the unlock time to the timer 112.

Figure 1B:
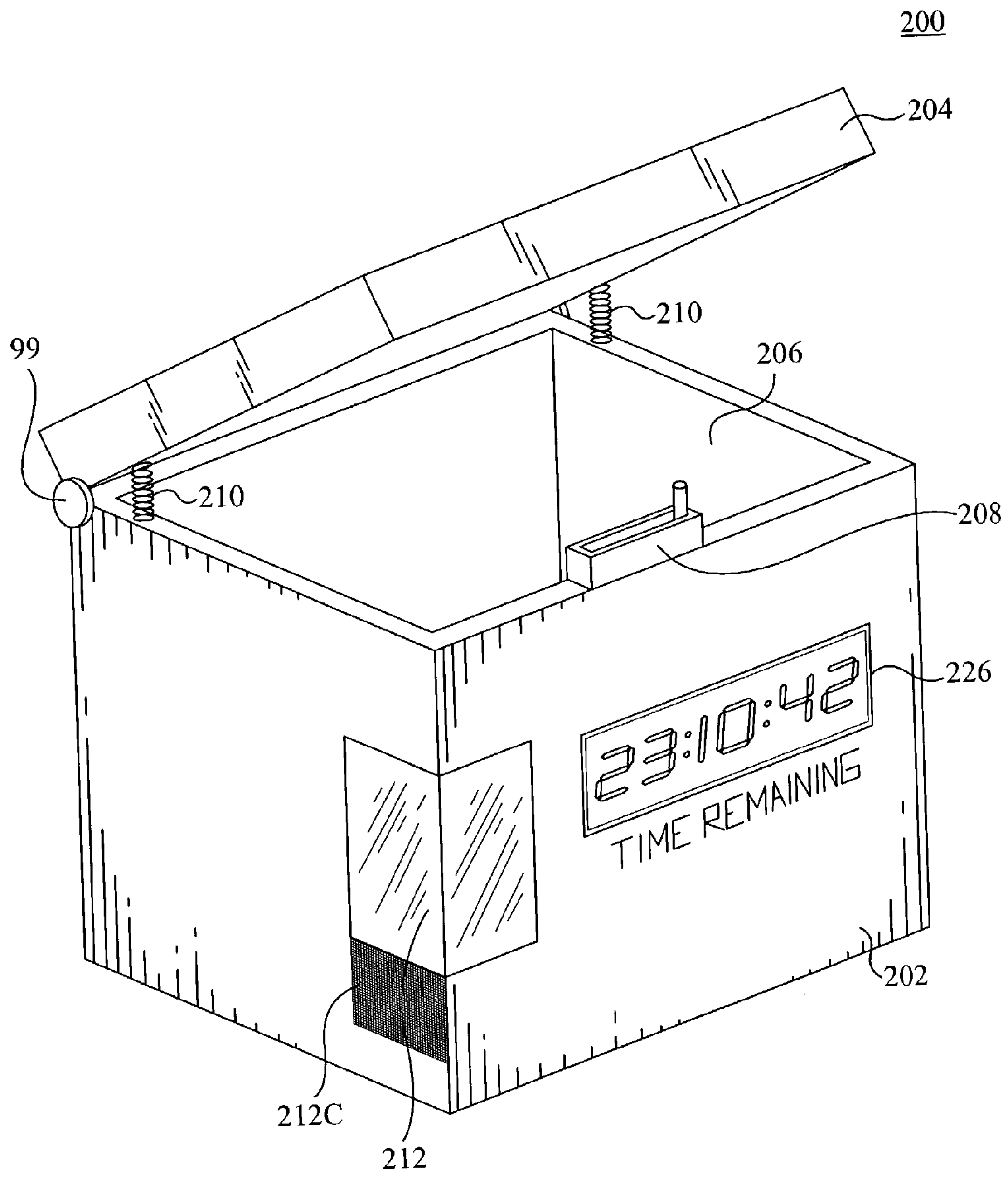
FIG. 1B illustrates a perspective view of an alternative container device in accordance with the present invention.

In an alternative embodiment, as shown in FIG. 1B, the container device 200 also includes a transceiver device 212 which communicates with a remotely located source 222. Alternatively, as shown in FIG. 3B, the container device 200 includes a separate transmitting component 212A and a receiver component 212B instead of a transceiver 212 (FIG. 1B). As shown in FIG. 3B, the receiver component 212B in the container device 200 receives signals from a transmitting means 218 that is coupled to a remotely located source 222. In addition, the transmitter 212A in the container device 200 transmits signals to a receiving means 220 coupled to the source 222. Alternatively, the transceiver 212 or transmitter device 212A transmits signals to other container devices 200 in a network 10 (FIG. 4). In reference to FIG. 3B, the receiver component 212B receives the unlock signal which unlocks the control circuit 214 in the container device 200. The receiver component 212B can alternatively be a sensor (e.g. microphone) which senses conditions external to the container device 200 whereby the sensor receiver 212B sends an instruction signal to the control circuit 214 upon sensing a change to a satisfactory condition.

As shown in FIG. 3B, the locking mechanism 208 is coupled to a transmitter 212A. The control circuit 214 is coupled to the locking mechanism 208. In one embodiment, the control circuit 214 includes a memory which stores the information provided in the signals sent to and from the source 222. The transmitter 212B is coupled to the receiver 212B, whereby the receiver 212B is coupled to the control circuit 214. A power source 216 is coupled to all of the above components to properly operate the container device 200.

Figure 2:
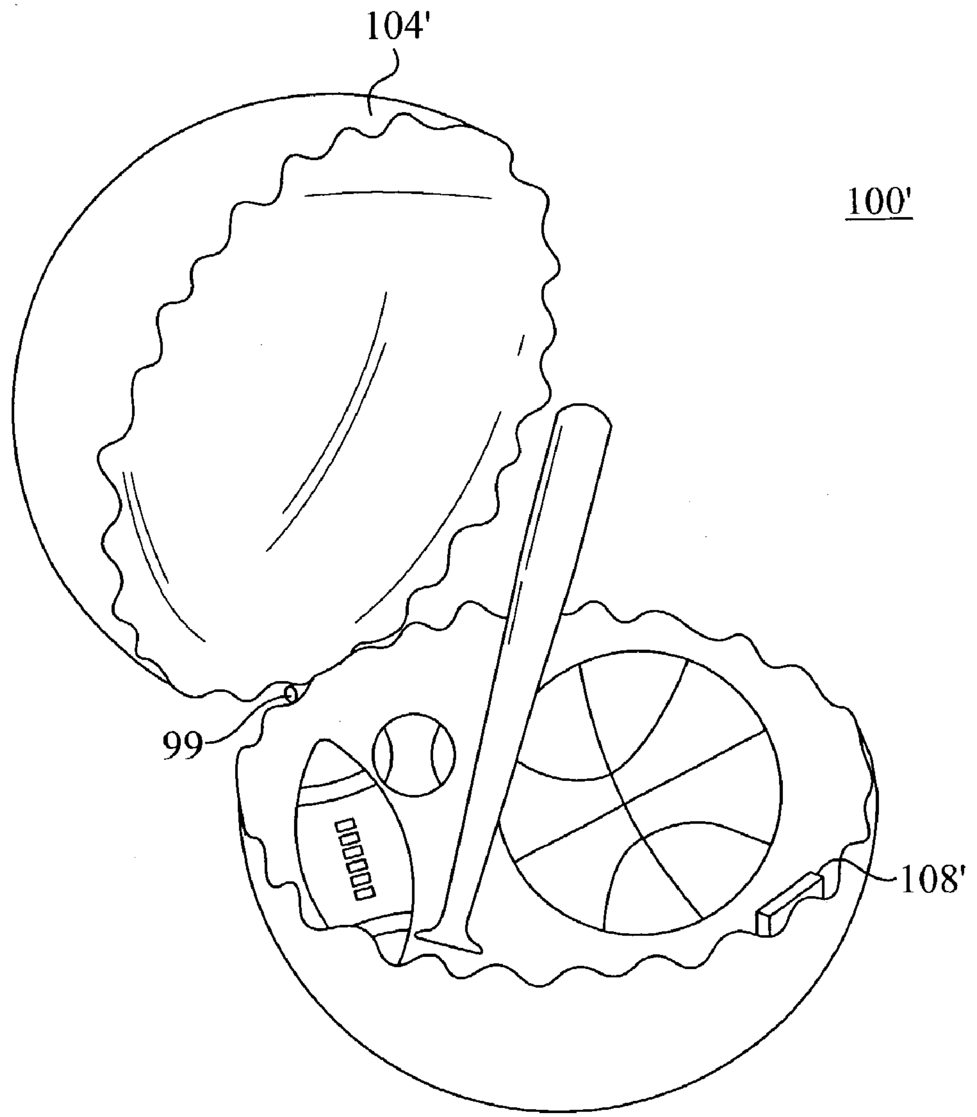
FIG. 2 illustrates a perspective view of an egg-shaped container device in accordance with the present invention.

FIG. 4 illustrates a network system 30 having a plurality of container devices 200A–E in accordance with the present invention. As shown in FIG. 4, the system 10 includes the remotely located source 222 which includes the transmitting means 218 and the receiving means 220 (FIG. 2). The source 212 transmits and receives signals with the several container devices 200A–E. It should be apparent that any number of container devices 200 may be included in the system 10, whereby the container devices 200 may be all located in one particular geographic area or dispersed over the world. The source 222 communicates with the container devices 200A–E via a communication media 230. The communication media 230 may utilize wireless signals via satellite, antenna, Bluetooth, WIFI, infra-red, radio frequency or any other appropriate communication media. Alternatively, the source 222 communicates with the container devices 200A–E via the communications media 230 through hardwire, such as cable wire, fiber optic or telephone line. Each container device 200 in the network is identifiable by a traceable serial number programmed into each container device's control circuit 214. Thus, each serialized control circuit 214 can be traceable by location or status (opened or closed) from the source 222. In one embodiment, the source 222 is coupled to a GPS system and sends a location request signal, included with or separate from the unlock signal, to each container device 200. Once the container device 200 receives the location request signal from the source 222, the container device 200 transmits a location signal to the GPS system and/or the source 222 which identifies the particular container device 200 as well as the geographic location of the container 200.

The source 222 is also coupled to an interface terminal 224 which allows the user to access the source 222 to either lock or unlock one or more selected container devices 200 as well as provide specific locking and unlocking instructions. The interface terminal 224 can be any appropriate communication means, including but not limited to, telephone 232, computer 236, World Wide Web 234, or any other electronic device 238 which is coupled to the transmitting and receiving means 218, 220 in the source 222. Alternatively, the interface terminal 224 may be configured directly on the container device 200.

In one instance, an individual may access the source 222 via the interface terminal 224 and enter in the serial number corresponding to a respective container device 200. The source 222 then transmits an unlock signal to the container device 200 having the entered serial number which unlocks the container device 200. An individual may also access the source 222 via the interface terminal and enter the serial number of her particular container device 200 and instruct the source 222 to lock her container device 200, whereby the source 222 sends a lock signal to her container 200. In addition, the instructing individual may also provide a code which the recipient of the container 200 must enter into the interface terminal 224 to unlock the container 200. Alternatively, the source 222 may be programmed to automatically send an unlock signal to one or more of the container devices 200A–E at a pre-selected or randomly set time. It should be noted that the above applications are examples and are not meant to limit the present invention thereto.

In one embodiment, the transmitting means 218 sends the same unlock signal to all activated container devices 200, whereby the container devices 200 automatically unlock their respective locking mechanisms 208 upon receiving the unlock signal. In another embodiment, one or more unlock signals sent from the transmitting means 218 instruct only certain container devices, such as for example, devices 200A and 200E in FIG. 4 to open at the same time, whereby the remaining devices, namely devices 200B, 200C and 200D are unlocked at a different time. In addition, other signals may be sent to different container devices 200 at one or more particular times. For instance, the source 222 alternatively sends a signal which contains the serial number of each container device 200 to sufficiently identify each container device 200 that is to be unlocked. In addition, the signal contains information to unlock the selected container devices 200 at a selected time. In yet another embodiment, one or more signals sent from the transmitting means 218 instruct only certain container devices, namely devices 200A and 200E which are in one geographical location to open at the same time, whereby the remaining devices, namely devices 200B, 200C and 200D in another geographic location to open at a different time. It should be noted that the above is one method of transmitting and receiving signals in the network 10, and it should be apparent to one skilled in the art that any other appropriate method of practicing the present invention in the context of a network 10 of container devices 200 is contemplated.

The transmitting means 216 in the source 222 transmits a respective lock or unlock signal to the control circuit 214 to actuate the locking mechanism 208. For brevity, the description only discusses the unlocking of the container device 200, however it is understood that the same applies for locking the container device 200. In one embodiment, the control circuit 214 is programmed to actuate the locking mechanism 208 to unlock upon receiving the unlock signal from the transmitting means 218. For example, the transmitting means 218 sends the unlock signal to the one or more container devices 200 at a predetermined time, such as Christmas morning, whereby the selected container devices 200 unlock upon sensing a change in an external condition, namely receiving the unlock signal. The time at which the unlock signal is sent may be programmed by an individual or the manufacturer of the container device 200. Alternatively, the unlock signal may be set randomly. The unlock signal is transmitted by itself or in combination with any other appropriate signals.

In yet another embodiment, the control circuit 214 is programmed to actuate the locking mechanism 208 upon the receiver 212B sensing a particular sound. Upon being activated, the receiver 212B senses the changes in the sounds, whereby the control circuit 214 uses conventional sound matching technology to produce a match with the programmed sounds. Upon sensing a match between the received sound and the programmed sound, the sensor 212B relays a match confirmation to the control circuit 214 which thereby actuates the locking mechanism 208. The sounds used to actuate the locking mechanism 208 include, but are not limited to voice recognition, speech patterns, utterance of preprogrammed set of words or phrases. Also, the control circuit 214 may be programmed to actuate the locking mechanism 208 based on a particular song played into a microphone 212C (FIG. 1B) coupled with the circuit 214. Thus, a particular song may be played near the container device 200, and the microphone 212C (FIG. 1B) will pick up the song, whereby the circuit 214 will perform a match analysis with the song stored in the circuit 214 and actuate the locking mechanism 208 upon finding a match.

In yet another embodiment, the receiver 212B may be a temperature sensor which is coupled to the control circuit 214. The control circuit 214 is programmed to unlock the locking mechanism 208 upon the temperature sensor 212B sensing a particular external temperature. The control circuit 214 carries out the programmed instructions, namely continuously sensing changes in temperature. Thus, the temperature sensor 212B senses the change in temperature in the setting around the container device 200 and sends the unlock signal to the control circuit 214. Upon receiving the unlock signal, the control circuit 214 unlocks the locking mechanism 208. It should be noted that the sensor 212B is alternatively configured to sense changes in any other external condition, including, but not limited to, changes in light, illumination, humidity, motion, altitude and location.

In yet another embodiment, as shown in FIG. 4, the source 222 is coupled to a Global Positioning Satellite (GPS) system 224, whereby the source 222 determines the location of the container device 200 and sends an unlock signal based on where the container device 200 is geographically located. The location of the container device 200 is determined by the container device 200 transmitting a location signal to the source 222 via the GPS system 224. In this embodiment, the source 222 is programmed to send an unlock signal to one or more container devices 200 that are located in a particular geographic location. As an example, the source 222 is programmed to send the unlock signal on Christmas Day to all the container devices 200 located in San Francisco, Calif. and send the unlock signal to all the container devices 200 located in San Jose, Calif. on New Years Eve. In this embodiment, the source 222 can be programmed to selectively send the unlock signal to any number or all of the container devices 200. For example, the source 222 can send an unlock signal to a single container device 200, using an identification code in the transmission, or to a group of container devices 200, using one or more identification codes recognized by the selected container devices 200.

In yet another embodiment, the control circuit 214 is programmed to actuate the locking mechanism 208 upon the receiver 212B sensing multiple events occurring in a particular order or the user performing one or more tasks. For example, the egg shaped container device 100' shown in FIG. 2 may be a child's toy, wherein the child must nurture the egg and perform certain tasks in caring for the egg 100'; before the egg 100' hatches. For instance, the control circuit (not shown) in this embodiment may be programmed to unlock the locking mechanism 108' upon the user heating the egg 100' in an incubator to a particular temperature, talking to the egg 100' and gently rocking the egg 100' over a period of days. Once these tasks are performed and sensed by the receiver (not shown), the control circuit (not shown) unlocks the locking mechanism 108'. It should be apparent to one skilled in the art that the tasks that must be satisfied are not limited to the examples discussed herein and may be any other appropriate task or combination of tasks. It should also be noted to one skilled in the art that the control circuit 214 may be programmed to actuate the locking mechanism 208 upon sensing a combination of more than one event and/or signal.

The transmitting means 216 at the source 222 can send a variety of different types of signals to the receiver 212B. The transmitting means 216 can send an initializing or operating signal which places the control circuit 214 into an operating mode, whereby the container device 200 is essentially "turned on" and senses changes to external conditions, such as receiving signals. In contrast, in the inactive mode, the container device 200 does not sense any external conditions such as receiving signals, whereby the container device 200 is essentially "turned off". When in the active operating mode, the circuit 214 begins to perform the operations which are preprogrammed into the control circuit 214, as will be discussed in more detail below. The active and inactive features are advantageous for circumstances in which the container device 200 is ready to be shipped or is placed on display in a store, such that the container device 200 does not inadvertently receive an unintended signal and therefore lock or unlock the container device 200. It should be noted that the operation signal is not necessary to the operation of the container device 200, whereby the control circuit 212 alternatively operates in a continuous, active state.

In addition, the source 222 can also transmit a programming signal to one or more container devices 200. As stated above, an individual (giver) can give the container device 200 as a gift to another person (recipient), whereby the giver can access the source 222 via the interface terminal 224 and reprogram the container device 200 to open at a particular time (recipient's birthday) or location (recipient's address). Upon providing the instructions to the source 222, the source 222 transmits a programming signal to that particular container device 200 which includes the instructions provided by the giver. The receiver 212B of that container device 200 then receives the programming signal and uploads the information to the container circuit 214. It should be apparent to one skilled in the art that the signals may be transmitted to the container device 200 separately or cumulatively in one signal by any appropriate means.

It should be noted that the operation of the control circuit 214 and receiver 212B as well as the transmitter 212A may also be used to close the container device 200. Thus, the container device 200 may be re-usable, whereby the recipient of the container device 200 may lock the container after it has been opened to keep items safeguarded. The recipient only has the code to re-open the container device 200 and must access the source 222 via the interface terminal 224 to unlock the container 200. Alternatively, the recipient of the container device 200 may use the container device 200 as a gift box to give to another person, whereby the control circuit 214 can be re-programmed to open at another time or after another condition is satisfied, as described above. Alternatively, as stated above, the control circuit 214 may be configured such that the control circuit 214 is re-programmable by the giver of the container 200, whereby the giver accesses the source 222 and enters in a new code or new set of instructions which must be satisfied by the new recipient of the container device 200 to receive the unlock signal.

In preferred operation, the giver of a gift purchases the container device 100, which is preferably unlocked and inactive. The giver places the gift inside the container device 100 and preferably closes the lid and locks the container device 100. Once the locking mechanism 108 is placed in the locked position, the container device 100 becomes activated and the timer 112 initiates countdown. The timer 112 is preferably preprogrammed by the manufacturer, whereby the packaging of the container device 100 indicates the amount of time which the timer 112 counts down from. Other methods of programming the timer 112 are discussed above. The giver then gives the container device 100 with the gift inside to the recipient, whereby the recipient is unable to open the container device 100 to retrieve the gift. The timer 112 counts down to zero and then sends an unlock signal to the control circuit, whereby the control circuit unlocks the locking mechanism 108. The lid 104 of the container device 100 preferably springs open once the container device 100 unlocks, thereby allowing the recipient to retrieve the gift inside.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A locking container device comprising:

a. a closeable container for holding at least one object;

b. a lock coupled to the container and moveable between a lock position and an unlock position; and c. a programmable circuit for automatically actuating the lock between the lock position and the unlock position at an unlock time, wherein the unlock time is a random time within a specified range, wherein the lock is moved to the lock position at activation and does not move to the unlock position until the unlock time and further wherein the container automatically opens upon the lock moving to the unlock position.

2. The container device according to claim 1 wherein the object within the container is inaccessible until the unlock time.

3. The container device according to claim 1 further comprising a display for displaying an amount of time remaining until the unlock time.

4. A locking container device comprising:

a. a closeable container for holding at least one object;

b. a lock coupled to the container and moveable between a lock position and an unlock position; and c. a programmable circuit coupled to the lock and configured to automatically actuate the lock between the lock position and the unlock position at a programmed time subsequent to activation, wherein the programmed time is a random time within a specified range, wherein the lock does not move until the programmed time and further wherein the container automatically opens upon the lock moving to the unlock position.

5. The container device according to claim 4 wherein the object within the container is inaccessible until the programmed time.

6. The container device according to claim 4 wherein the container is accessible only until the programmed time.

7. The container device according to claim 4 further comprising a display for displaying an amount of time remaining until the programmed time.

8. A portable locking container device comprising:

a. a closeable container for holding at least one object;

b. a lock coupled to the container and moveable between a lock position and an unlock position and further wherein the container automatically opens upon the lock moving to the unlock position;

c. an electronic sensor for sensing a change in at least one external condition; and d. a circuit coupled to the electronic sensor and for actuating the lock to move between the lock position and the unlock position in response to the change in the external condition, wherein the external condition is time dependent and further wherein the time dependent external condition is randomly determined.

9. A portable locking container device comprising:

a. a closeable container for holding at least one object;

b. a lock coupled to the container and moveable between a lock position and an unlock position and further wherein the container automatically opens upon the lock moving to the unlock position;

c. an electronic sensor for sensing a change in at least one external condition; and d. a circuit coupled to the electronic sensor and for actuating the lock to move between the lock position and the unlock position in response to the change in the external condition, wherein the external condition is sound dependent.

10. The container device according to claim 9 further comprising a microphone for receiving the sound dependent external condition.

11. A selectively locking portable container device comprising:
a. a container for holding one or more objects;
b. a lock for locking the container, wherein the lock is moveable between a lock position and an unlock position;
c. a circuit for selectively moving the lock between the lock position and the unlock position upon receiving an unlock signal from a remote transmitting source; and
d. a receiver for receiving the unlock signal, wherein the receiver further includes a sensor, wherein the circuit moves the lock between the lock position and the unlock position in response to the sensor sensing a change from a first environmental state to a second environmental state, wherein the first and second environmental states are sound dependent.

12. The container device according to claim 11 wherein the circuit further comprises a transmitter for transmitting an appropriate signal to the remotely located source.

13. The container device according to claim 11 wherein the unlock signal is transmitted via a wireless medium.

14. The container device according to claim 11 wherein the unlock signal is transmitted via a hard-wired medium.

15. The container device according to claim 11 wherein the unlock signal includes a time component instruction, wherein the time component instruction instructs the circuit to actuate the lock at a specific time.

16. The container device according to claim 15 wherein the specific time provided by the time component instruction is predetermined.

17. A selectively locking portable container device comprising:
a. a container for holding one or more objects;
b. a lock for locking the container, wherein the lock is moveable between a lock position and an unlock position; and
c. a circuit for selectively moving the lock between the lock position and the unlock position upon receiving an unlock signal from a remote transmitting source, wherein the unlock signal includes a time component instruction, wherein the time component instruction instructs the circuit to actuate the lock at a specific time, wherein the specific time provided by the time component instruction is random.

18. The container device according to claim 11 wherein the unlock signal includes a geographical component instruction, wherein the circuit actuates the lock to move between the lock position and unlock position when the container is in a specific geographical location specified by the geographical component instruction.

19. The container device according to claim 11 wherein the circuit is placed in an operating mode upon receiving an operation signal from the remotely located source.

20. The container device according to claim 11 wherein the container automatically opens upon the lock moving to the unlock position.

21. The container device according to claim 11 wherein the container unlocks and is manually openable upon the lock moving to the unlock position.

22. The container device according to claim 11 further comprising an interface terminal coupled to the remote source location, the interface terminal configured to accept at least one external condition instruction to be transmitted to the circuit.

23. A system including a plurality of selectively locking container devices comprising:
a. plurality of container devices each further comprising:
i. container for holding one or more objects;
ii. a lock coupled to the container and moveable between a lock position and an unlock position; and
iii. a receiver circuit coupled to the lock, the receiver circuit configured to actuate the lock between the lock and unlock position; and
b. a transmitting source for selectively transmitting one or more instruction signals to the plurality of container devices, wherein the receiver circuit in at least one selected container device automatically moves the lock between the lock position and the unlock position in response to receiving the one or more instruction signals, wherein the one or more instruction signals include a time dependent parameter, wherein the lock moves between the lock position and unlock position at an appropriate time specified by the time dependent parameter, and further wherein the time dependent parameter is randomly determined.

24. The system according to claim 23 wherein the receiver circuit moves the lock a predetermined amount of time after receiving the one or more instruction signals.

25. The system according to claim 23 wherein the receiver circuit moves the lock simultaneously upon receiving the one or more instruction signals.

26. The system according to claim 23 wherein the transmitting source is remotely located from the plurality of container devices.

27. The system according to claim 26 wherein the one or more instruction signals are wirelessly transmitted.

28. The system according to claim 26 wherein the one or more instruction signals are transmitted via hard wire.

29. The system according to claim 23 wherein the one or more instruction signals include a geographically dependent parameter, wherein the receiver circuit instructs the lock to move between the lock position and unlock position when the container device is in an appropriate geographical location.

30. The system according to claim 23 wherein the instruction signal is dependent on a predetermined operation being satisfied prior to the lock moving between the lock and unlock positions.

31. The system according to claim 23 wherein at least one of the receiver circuits in the plurality of container devices actuates the lock in response to an appropriate change in temperature.

32. A system including a plurality of selectively locking container devices comprising:
a. a plurality of container devices each further comprising:
i. a container for holding one or more objects;
ii. a lock coupled to the container and moveable between a lock position and an unlock position; and
iii. a receiver circuit coupled to the lock, the receiver circuit configured to actuate the lock between the lock and unlock position; and
b. a transmitting source for selectively transmitting one or more instruction signals to the plurality of container devices, wherein the receiver circuit in at least one selected container device automatically moves the lock between the lock position and the unlock position in response to receiving the one or more instruction signals, wherein at least one of the receiver circuits in the plurality of container devices actuates the lock in response to an appropriate variation in sound.

33. The system according to claim 23 wherein at least one of the container devices automatically opens upon the lock moving to the unlock position.

34. The system according to claim 23 wherein at least one of the containers unlocks and is manually openable upon the lock moving to the unlock position.

35. The system according to claim 23 further comprising an interface terminal coupled to the transmitting source, the interface terminal configured to accept at least one external condition instruction to be transmitted to one or more of the receiver circuits.

* * * * *